United States Patent
Liu et al.

(10) Patent No.: US 10,521,012 B2
(45) Date of Patent: Dec. 31, 2019

(54) METHOD FOR AUTOMATICALLY IDENTIFYING AT LEAST ONE USER OF AN EYE TRACKING DEVICE AND EYE TRACKING DEVICE

(71) Applicant: APPLE INC., Cupertino, CA (US)

(72) Inventors: Kun Liu, Berlin (DE); Fabian Wanner, Berlin (DE); Walter Nistico, Berlin (DE); Matthias Nieser, Berlin (DE)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/557,588

(22) PCT Filed: Mar. 10, 2016

(86) PCT No.: PCT/EP2016/055189
§ 371 (c)(1),
(2) Date: Sep. 12, 2017

(87) PCT Pub. No.: WO2016/146488
PCT Pub. Date: Sep. 22, 2016

(65) Prior Publication Data
US 2018/0052514 A1 Feb. 22, 2018

(30) Foreign Application Priority Data
Mar. 13, 2015 (EP) .................... 15159078

(51) Int. Cl.
*G06F 3/01* (2006.01)
*G06K 9/00* (2006.01)
*G10L 17/00* (2013.01)

(52) U.S. Cl.
CPC .......... *G06F 3/013* (2013.01); *G06K 9/00597* (2013.01); *G06K 9/00885* (2013.01); *G10L 17/00* (2013.01)

(58) Field of Classification Search
CPC .............. G06F 3/013; G06K 9/00597; G06K 9/00885; G10L 17/00
See application file for complete search history.

(56) References Cited

U.S. PATENT DOCUMENTS 7,233,684 B2 * 6/2007 Fedorovskaya ... G06F 17/30265
382/118
8,885,882 B1 * 11/2014 Yin ........................... G06F 3/00
382/103

(Continued)

FOREIGN PATENT DOCUMENTS

DE 102013012639 A1 1/2015
WO 2012052061 A1 4/2012

OTHER PUBLICATIONS

International Search Report and Written Opinion for PCT/EP2016/055189 dated May 25, 2016.

(Continued)

*Primary Examiner* — Sejoon Ahn
(74) *Attorney, Agent, or Firm* — Fernando & Partners, LLP; Bejan Hafezzadeh

(57) ABSTRACT

The invention relates to a method for automatically identifying at least one user of an eye tracking device (10) by means of the eye tracking device (10), wherein user identification data of the at least one user are captured by a capturing device (14) of the eye tracking device (10). Under the first condition that at least one profile (P1, P2, P3) with associated identification data (I1, I2, I3) of at least one specific user is stored in a storage medium (20), the stored identification data (I1, I2, I3) of the at least one profile (P1, P2, P3) are compared with the captured user identification data, and under the second condition that the captured user identification data match the stored identification data (I1, I2, I3) according to a predefined criterion, the at least one (Continued)

Figure 1:
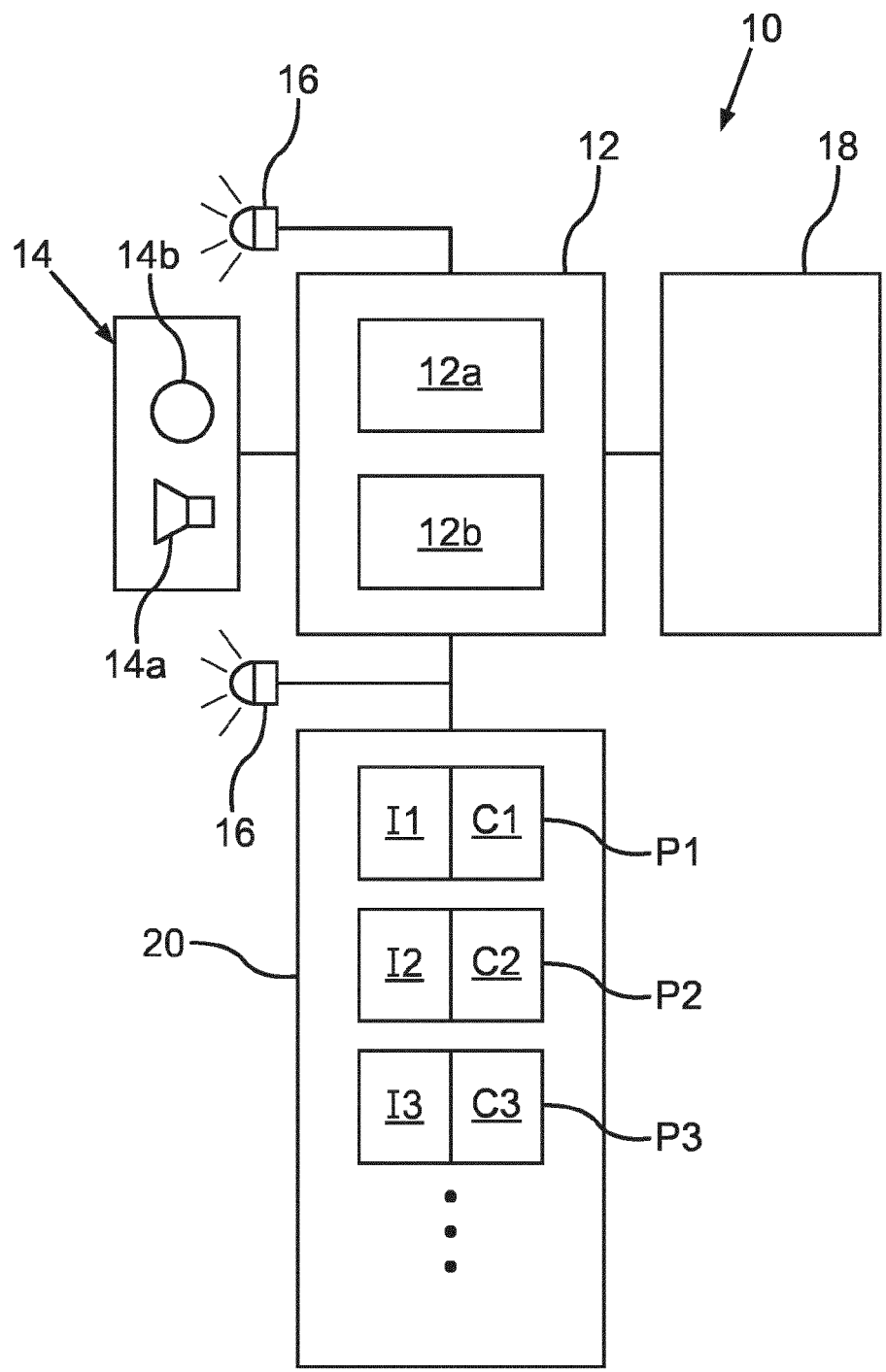

user is identified as the at least one specific user, for whom the at least one profile (P1, P2, P3) was stored.

20 Claims, 4 Drawing Sheets

(56) References Cited

U.S. PATENT DOCUMENTS

| | | | |
|---|---|---|---|
| 2003/0146901 A1* | 8/2003 | Ryan | G06F 3/013 345/158 |
| 2005/0175218 A1* | 8/2005 | Vertegaal | A61B 3/113 382/103 |
| 2005/0225723 A1* | 10/2005 | Pilu | A61B 3/113 351/209 |
| 2007/0171363 A1* | 7/2007 | Chen | A61B 3/145 351/200 |
| 2008/0269958 A1* | 10/2008 | Filev | B60W 50/10 701/1 |
| 2009/0174864 A1* | 7/2009 | Hutchin | A61B 3/113 351/210 |
| 2010/0027890 A1* | 2/2010 | Yoshinaga | G06F 3/013 382/195 |
| 2010/0053555 A1* | 3/2010 | Enriquez | A61B 3/113 351/210 |
| 2011/0175932 A1* | 7/2011 | Yu | G06F 3/013 345/661 |
| 2012/0212597 A1* | 8/2012 | Hanna | G06K 9/00604 348/78 |
| 2014/0050370 A1* | 2/2014 | Inkumsah | G06F 21/32 382/117 |
| 2014/0055591 A1* | 2/2014 | Katz | G06F 3/013 348/78 |
| 2014/0204029 A1* | 7/2014 | Lopez | G06F 3/013 345/163 |
| 2014/0226131 A1* | 8/2014 | Lopez | G06F 1/1626 351/210 |
| 2014/0232638 A1 | 8/2014 | Choi et al. | |
| 2016/0070105 A1* | 3/2016 | Tannoudiji | G02B 27/017 345/8 |
| 2016/0131902 A1* | 5/2016 | Ambrus | G02B 27/0093 345/156 |
| 2017/0046813 A1* | 2/2017 | Wu | G06K 9/00288 |
| 2017/0196451 A1* | 7/2017 | Tian | A61B 3/113 |
| 2018/0052514 A1* | 2/2018 | Liu | G06F 3/013 |

OTHER PUBLICATIONS

International Preliminary Report on Patentability for PCT/EP2016/055189 completed Jun. 9, 2017.

* cited by examiner

METHOD FOR AUTOMATICALLY IDENTIFYING AT LEAST ONE USER OF AN EYE TRACKING DEVICE AND EYE TRACKING DEVICE

The invention relates to a method for automatically identifying at least one user of an eye tracking device by means of the eye tracking device and a corresponding eye tracking device.

Methods for user identification are known from the prior art like from Microsoft's Kinect for the Xbox. Here the user identification is considered as a key component of Microsoft's Kinect for the Xbox, to recognize and track player identity. It can learn a player's appearance over time in a game session. The identification can be associated with a sign in profile in the Xbox system.

User identification for such devices usually is used to determine, whether users are authorized for using that devices or not, or to load user specific settings like most recently played games or favourite games and so on.

Also eye tracking devices and eye tracking systems are known from the prior art. Eye tracking devices are configured to track persons, especially their eyes, their point of regard or gaze direction. Also, in this connection profiles may be stored for specific users, however for different purposes as those described above. User calibration is essential to all mainstream eye tracking systems, which can achieve 0.5 to 1 degree accuracy in gaze angle. A calibration process would normally require the user to look at several preselected points on a screen, and then a set of user specific parameters can be calibrated and stored for the further eye tracking in a profile. As certain properties of human eyes are different from person to person, usually the calibration result of one person will not produce accurate eye tracking for another one. Therefore the current eye tracking systems usually generate a profile for each user to store the calibration result and some other specific setting. This allows the user to load his/her calibration data from the previous session instead of doing a new calibration.

Known eye tracking devices suffer from a number of drawbacks due to the fact that, before a user actually can use the eye tracking functionalities of his eye tracking system he has to perform several tasks. In practice, a user has to register a new profile before doing a calibration. Furthermore, then the calibration procedure has to be performed, which normally takes about 15 seconds to 30 seconds, which varies from system to system, and also depends on the experience and ability of the user. When the same user comes to use the system later, he or she has to select the profile manually so that the system will load the stored calibration data. If a wrong profile is selected by the user, the wrong calibration data will severely degrade the tracking accuracy and the error could be more than 5 degree in gaze angle. Since the user has to tell the system, which profile to use, it can be a real burden and dramatically degrade the user experience when, for example, the users change frequently or the user is unable to use mouse/keyboard easily.

Moreover, the classical user calibration procedure used by the mainstream eye tracking systems is rather interruptive and unfriendly for certain application contact. It is believed that such classical calibration is one of the major barriers preventing the eye tracking techniques to be integrated into more applications.

Therefore it is an object of the present invention to facilitate the use of eye tracking devices and reduce the efforts a user has to make for using an eye tracking device.

This object is solved by a method for automatically identifying at least one user of an eye tracking device by means of the eye tracking device with the features according to claim 1 and an eye tracking device for automatically identifying at least one user with the features of claim 15. Advantageous embodiments of the invention are presented in the subclaims.

According to the invention the method for automatically identifying at least one user of an eye tracking device by means of the eye tracking device comprises the steps:

a) Capturing user identification data of the at least one user by a capturing device of the eye tracking device;

b) Under the first condition that at least one profile with associated identification data of at least one specific user is stored in a storage medium, comparing the stored identification data of the at least one profile with the captured user identification data; and c) Under the second condition that the captured user identification data match the stored identification data according to a predefined criterion, identifying the at least one user as the at least one specific user, for whom the at least one profile was stored.

Therefore advantageously users can be automatically identified by the eye tracking device without having to choose their respective profiles manually. This reduces the overall effort for using an eye tracking device enormously. The capturing device of the eye tracking device can for example comprise an imaging device, like a camera or an image sensor, by means of which the user identification data, like certain user characteristics, can be easily captured so that the eye tracking device does not even need additional components to perform this automatic user identification. Furthermore, by means of this automatic user identification also eye tracking relevant data stored in the corresponding profiles can be automatically derived from this profile after the user has been identified and used for subsequent eye tracking. So if, for example, a calibration has already been performed for a user, then any time later this user can just sit in front of his eye tracking device and make use of it without any further tasks like choosing manually his corresponding profile. This is especially advantageous if multiple users use the same eye tracking device. Different users can change frequently without having to choose their respective settings every time. Also it is not even necessary to register a new profile manually before doing a calibration as by capturing user identification data, these data can also be stored in a profile automatically and be used any time later. Another great advantage of this automatic user identification, especially in connection with the use of the eye tracking device, is that it can be avoided that a user accidentally chooses the wrong profile and then wrong calibration data are used for eye tracking.

The user identification data can comprise, for example, image data and/or numerical values of features of the at least one user. Especially image data can be easily captured by the eye tracking device and analysed to derive user characteristics therefrom which allow the identification of the user.

Especially, the captured user identification data of the at least one user and/or the identification data of the specific user comprise at least one of:

a face image and/or a face characteristic;

a body image and/or a body characteristic, especially at least one geometric property of the body;

eye properties, especially at least one geometric property of at least one eye of the user;
an eye motion pattern;
a voice characteristic; and
information about corrective glasses.

All of these characteristics can advantageously be used for identifying a user. Most of them even can be derived from captured images so that the eye tracking device advantageously does not need any additional components. However, for further enhancing the reliability of correct user identification additional components can be used as well, like a microphone for capturing a voice characteristic of the user.

According to one advantageous embodiment of the invention, the predefined criterion in step c) consists of a feature matching method for the identification data, and a threshold. In this embodiment, all elements of identification data will be converted into numerical feature data, including the image features computed from the face images and the numerical values describing the eye properties. To compare two sets of such numerical features, a similarity score can be computed. A threshold is then selected so that a higher score indicates that the data in comparison are collected from the same person. When there are multiple matching candidates from different profiles, the system can choose the best match or let the user to decide.

According to another advantageous embodiment of the invention, the predefined criterion in step c) can be based on a speech recognition module. The system in this embodiment asks the user to speak a code word to identify him or her to the system when a profile is created. The identification data is the audio recording of the user's voice. The system will consider that the current user matches to the stored identification data, if the speech recognition module detects the code word pattern in the captured audio.

According to another advantageous embodiment of the invention in step a) for capturing the user identification data at least one image of at least one body part of the at least one user is captured, especially by means of an imaging device of the capturing device, and the user identification data are determined on the basis of the captured image, especially by means of the processing unit of the eye tracking device. Deriving user characteristics from captured images is especially advantageous as already explained, because no additional components of the eye tracking device are required. The eye tracking device simply can capture images of the user, by means of the camera for example, and the processing unit processes these images to derive the user identification data therefrom. Moreover, eye tracking devices, and preferably also the eye tracking device according to this invention, usually have the ability to capture images of the whole face of large part of the face of a user anyway. Therefore, especially face recognition techniques can be applied very easily to derive the user identification data form the image.

According to another advantageous embodiment of the invention the at least one profile comprises profile data including the associated identification data of the specific user and user specific control data for the specific user. The stored identification data are used, as explained above, to be able to re-identify the user, for who these data were stored. However, the great advantage of this embodiment is, that also additional data, which are not used for identifying a user, can be stored in the profile, like calibration data, which can then also be automatically be derived from the profile and used by the eye tracking device after the user has been identified.

According to another advantageous embodiment of the invention for storing the at least one profile of the specific user a calibration procedure is performed, during which at least one calibration parameter of the specific user is determined and stored as the control data or part of the control data in the user profile for the specific user. In particular that calibration parameter can contain a gaze correction information for the specific user, like an offset between a visual axis and an optical axis of the at least one eye of the specific user. During such a calibration procedure not only the calibration parameters can be determined and stored, but also the user identification data can be determined in such a calibration procedure at the same time as well and stored in the corresponding profile. So a user does not even have to register his profile itself, as everything can be done automatically by the eye tracking device during a calibration procedure. So if a new user uses the eye tracking device and performs a calibration procedure the eye tracking device automatically stores a profile for this user, derives the identification data from e.g. the images captured during the calibration procedure, derives the calibration data or calibration parameters necessary for eye tracking from this calibration procedure, and stores everything in the corresponding profile. This user can then use the eye tracking device any time later without having to perform any tasks, as the eye tracking device automatically can identify the user again on the basis of the stored identification data, and automatically derive the calibration parameters from his profile and the user can immediately use the eye tracking functionalities of the eye tracking device.

According to another advantageous embodiment of the invention, if in step c) the at least one user is identified as the specific user, the profile data, especially the at least one calibration parameter, is used for eye tracking of the at least one user. This calibration parameter can for example be used to calculate the gaze direction of the user or the point of regard, for example on a screen of the eye tracking device. Due to the automatic user identification it can be avoided that a user chooses accidentally the wrong profile, so that especially when deriving the calibration parameters from the respective automatic determined profile detrimental impact on the eye tracking accuracy by using wrong calibration data can be avoided.

According to another advantageous embodiment of the invention the calibration procedure is performed as an implicit calibration procedure, especially wherein an actual point of regard of the at least one specific user is estimated on the basis of image content of images shown on a display device of the eye tracking device. This is an especially advantageous embodiment as in this case the user does not even notice that a calibration procedure is performed at the moment. In a classical calibration procedure usually points are shown one after the other at different positions on a screen and the user is asked to fixate these points. During the user is fixating each of these points the eye tracking device calculates the point of regard of the user and compares the calculated points of regard with the position of the shown points on the screen, which is assumed to be the actual point of regard. Such a procedure can be very boring for a user, is very time consuming and requires complete concentration of the user. Instead in the implicit calibration procedure no points are shown, which the user has to fixate. In such an implicit calibration procedure the eye tracking device calculates the point of regard of a user and estimates the actual point of regard, namely the point on the screen the user is actually looking at the time the eye tracking device calculates the point of regard, on the basis of image content shown on the screen of a display device at that moment. If the user, for example, works on a computer and moves the mouse cursor, it can be assumed that also the eyes of the user will follow that mouse cursor, so that the position of the mouse cursor can be estimated as the actual point of regard of the user. If the user is for example watching a film, it can be assumed that the eyes of the user will look on faces or eyes of persons shown in the film, or on the mouths of persons speaking in that film. Such an implicit calibration usually takes more time, but has the great advantage, that a user is actually not aware of the fact that at the moment a calibration procedure is performed.

These features of performing an implicit calibration in connection with the previously described embodiments, especially the automatic user identification, the automatic storing of profiles with identification data and calibration data have the great advantage that a user of an eye tracking device now does not have to perform any tasks anymore for making use of the eye tracking functionalities. He does not have to register profiles, to choose his profile, to actively perform a calibration, to choose his profile again if in between another user has used the eye tracking device, and so on.

Moreover, the control data, like the calibration parameters, which are stored in the profile besides the identification data, can comprise further very advantageous data, which can be used for eye tracking or for using the eye tracking device. Therefore it is an especially advantageous embodiment of the invention when the control data relate to at least one of the following.

the at least one calibration parameter of the specific user;
an information about corrective glasses of the specific user, especially if the specific user wears corrective glasses or not and/or which refractive power the corrective glasses comprise;
rights and/or permissions of the specific user, especially that define the range of abilities and/or functions a user identified as a specific user is allowed to perform on a system comprising the eye tracking device;
a priority of the specific user, especially with respect to another specific user, wherein the priority of the specific user with respect to the other specific user defines, the interaction of which of the specific users' interaction with the system has priority, especially in case of contradicting interactions.

As with regard to the information about corrective glasses, which can, as explained above also be used as identification data, this information can also be used as control data, for example by processing unit of the eye tracking device. For example, the refractive power of corrective glasses can influence the calculated gaze direction, so knowing this refractive power can be used to correct the calculated gaze direction correspondingly to improve the eye tracking accuracy. To have rights, permissions or priorities of specific user saved in the profile is especially advantageous with regard to multiple users using the same eye tracking device. So on the basis of these data the eye tracking device can decide which user is allowed to do which tasks and which users have priority over others.

According to another advantageous embodiment of the invention under the third condition that the at least one user is identified as the specific user in step c) a processing unit of the eye tracking device is controlled in dependency of the control data or the profile of the specific user, the at least one user was identified as. This controlling can be done as described above. If the user is identified, the processing unit can read out the control data of the corresponding user profile and control the eye tracking device or any other system coupled with eye tracking device in dependency of these data, for example calculating the gaze direction or a point of regard taking into account the stored calibration parameters, information about corrective glasses, allowing or prohibiting certain tasks for the identified user according to his rights or priority data, and so on. Especially the processing unit controls at least one system parameter of the eye tracking device or a system, which comprises the eye tracking device, in dependency of the permissions and/or rights and/or priority of the specific user, the at least one user is identified with.

According to another advantageous embodiment of the invention, if no profile is stored of if the captured user identification data do not match the stored identification data of the at least one profile, a new profile, especially with the captured identification data, for the at least one user is stored. So if no profile is stored or the captured user identification data do not match, the eye tracking device recognizes the user as a new user and can automatically store a new profile for this user with the corresponding captured user identification data. Moreover, in these cases, the eye tracking device also can automatically initiate the calibration procedure, preferably as an implicit calibration procedure, for the at least one user. So, advantageously new user profiles can be created automatically without requiring any active action of the user.

According to another advantageous embodiment of the invention if the at least one profile is the only profile stored in the storage medium, the processing unit determines for checking whether the second condition is fulfilled, whether the identification data of the profile match the captured user identification data of the at least one user within a predetermined threshold, and if several profiles with associated identification data are stored, the processing unit for checking whether the second condition is fulfilled performs a feature matching by determining that profile from the stored profiles, the identification data of which have the smallest deviation from the captured user identification data of the at least one user, in particular wherein after performing the feature matching the processing unit checks whether the identification data of the determined profile match the captured user identification data of the at least one user within a predetermined threshold.

In other words, if only one profile is stored and the eye tracking device detects a user, the eye tracking device only has to determine whether the captured user identification data match the stored identification data sufficiently, i.e. within that predetermined threshold. If several profiles are stored, the processing unit can first perform, for example a nearest neighbour matching, to choose the profile which fits best. After having found the best profile candidate it can be verified whether the identification data of this profile match the user identification data sufficiently, namely again by means of a predetermined threshold. This procedure works advantageously with any arbitrary number of users and profiles. However, as the accuracy of user recognition may drop when the number of candidates, namely different users, grows, it might be advantageous to restrict the number of storable profiles to a predefined maximum number.

Alternatively or additionally, the accuracy of user recognition can also be enhanced by the following advantageous embodiments of the invention: For example, if the at least one user is identified as the specific user in step c) a request for confirmation of the identification is outputted on a display of the eye tracking device. Thereby advantageously a possibility is provided for the user to actively check whether the correct profile has been chosen. Also according to another advantageous embodiment of the invention, if the eye tracking device receives a user input indicating that the identification is wrong, the eye tracking device stores a new profile for the at least one user for the captured user identification data. The user input advantageously can also be used for an automatical learning process of the eye tracking device. For example, if the eye tracking device receives a user input indicating that the identification is wrong, the processing unit can modify at least one parameter relating to the at least one predefined criterion in the second condition, which is the matching condition, in a predefined way. E.g. the processing unit can modify the above named predetermined threshold or parameters of the feature matching or make use of this user interaction to improve the recognition accuracy of the eye tracking device in any different way.

The invention further relates to an eye tracking device for automatically identifying at least one user, wherein the eye tracking device comprises a storage medium configured to store at least one profile with associated identification data of a specific user. Furthermore, the eye tracking device comprises a capturing device, for example an imaging device like one or more cameras or image sensors, configured to capture user identification data of the at least one user, a processing unit configured, under the first condition that the at least one profile with associated identification data of at least one specific user is stored in the storage medium, to compare the stored identification data of the at least one profile with the captured identification data of the at least one user, wherein the processing unit is further configured to identify the at least one user as a specific user, for whom the at least one profile is stored, under the second condition that the user identification data match the stored identification data according to a predefined criterion.

The preferred embodiments and advantages thereof described with regard to the method according to the invention correspondingly apply to the eye tracking device according to the invention, wherein in particular the embodiments of the method constitute further preferred embodiments of the eye tracking device. Furthermore, the invention may also relate to a system comprising the eye tracking device according to the invention.

Further features of the invention and advantages thereof derive from the claims, the figures, and the description of the figures. All features and feature combinations previously mentioned in the description as well as the features and feature combinations mentioned further along in the description of the figures and/or shown solely in the figures are not only usable in the combination indicated in each case, but also in different combinations or on their own.

Figure 2:
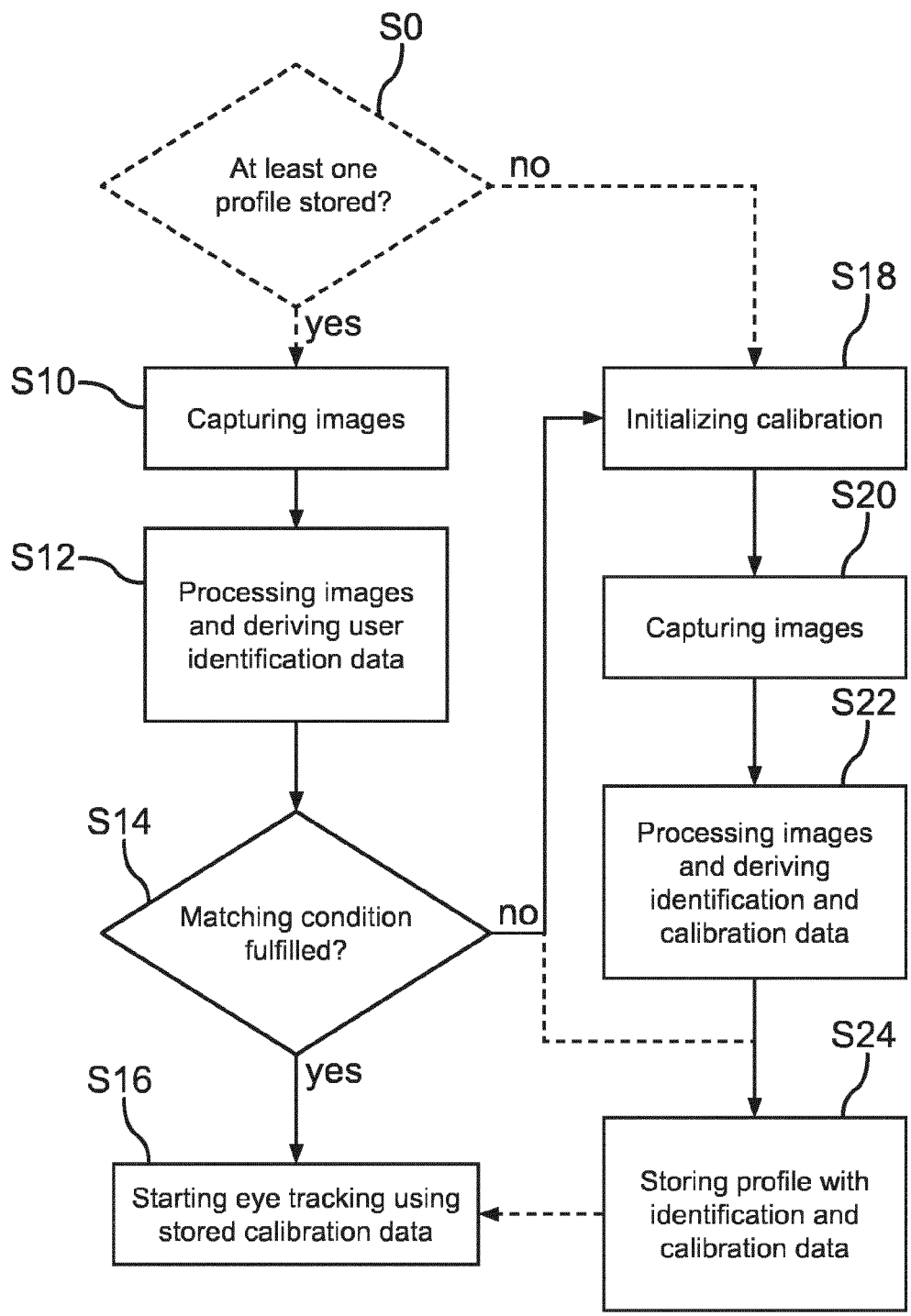
Figure 3:
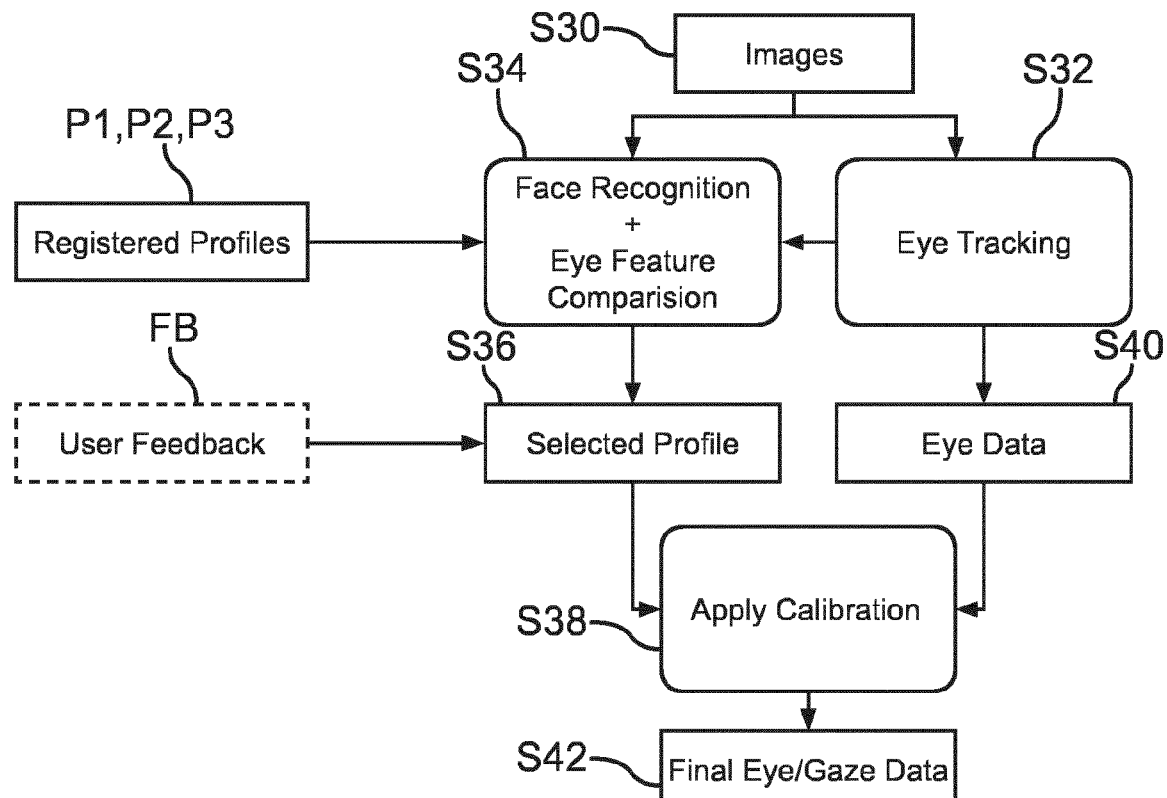
Figure 4:
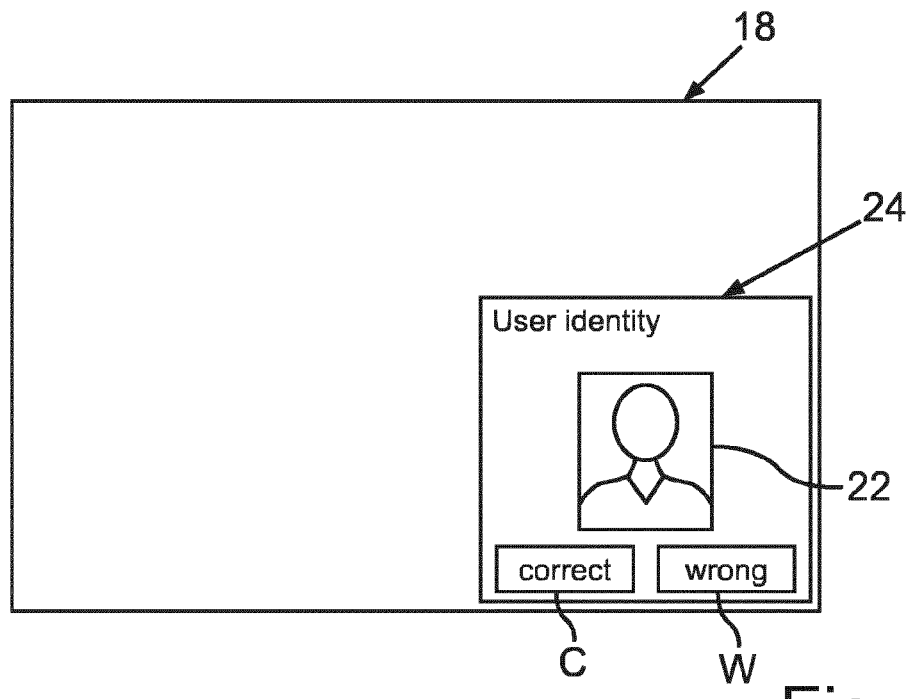
Figure 5:
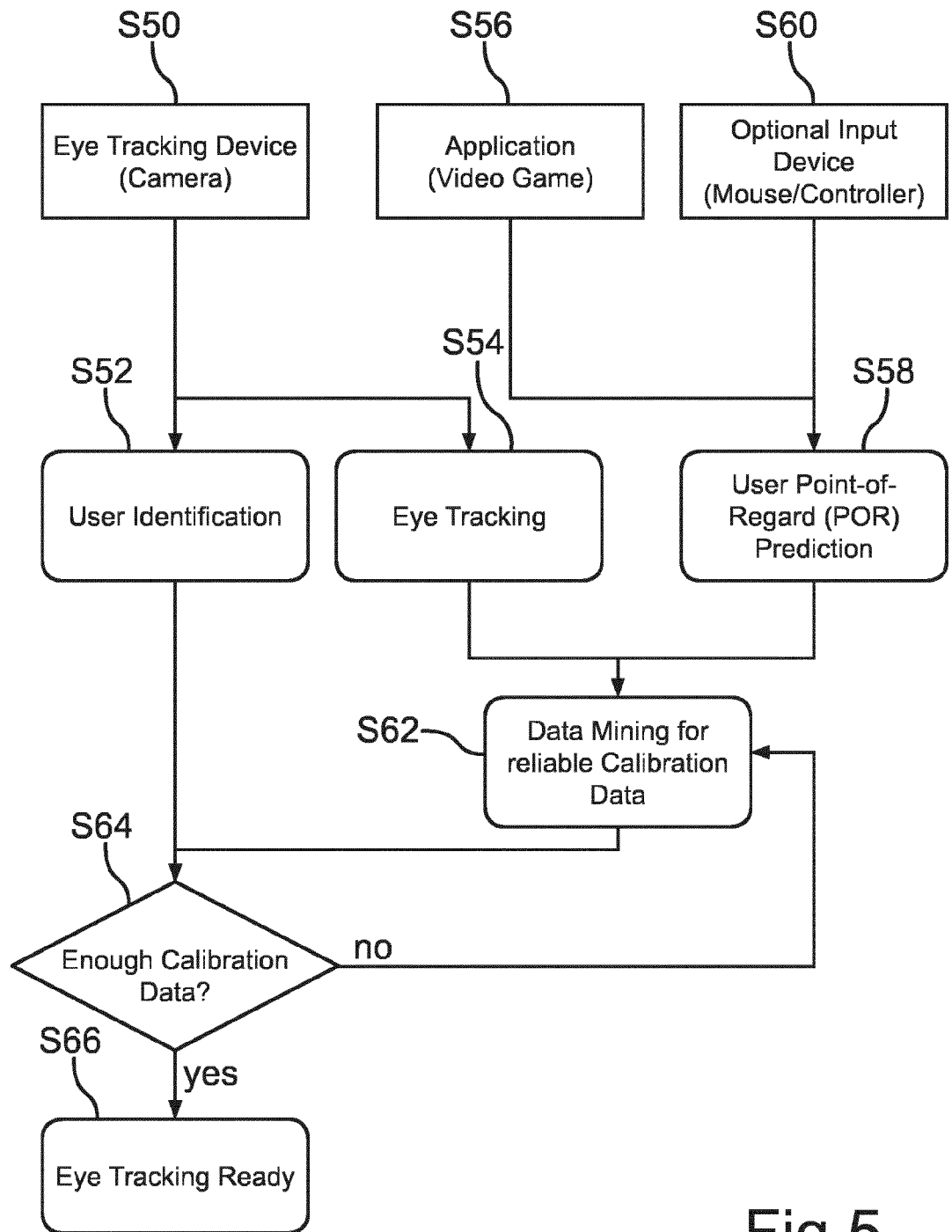

The invention is now explained in more detail with reference to individual preferred embodiments and with reference to the attached drawing. These show in:

FIG. 1 a schematic illustration of an eye tracking device for automatically identifying users according to an embodiment of the invention;

FIG. 2 a schematic illustration of a method for automatically identifying users by means of an eye tracking device according to an embodiment of the invention;

FIG. 3 a schematic illustration of a method for automatically identifying users by an eye tracking device according to another embodiment of the invention;

FIG. 4 a schematic illustration of a display device of an eye tracking device for providing feedback according to an embodiment of the invention; and FIG. 5 a schematic illustration of a method for automatically identifying users by means of the eye tracking device in combination with implicit calibration according to an embodiment of the invention.

In the following, advantageous embodiments of the invention are presented, which apply user identification techniques to improve the usability of eye tracking systems.

FIG. 1 shows a schematic illustration of an eye tracking device 10 for providing automatic user identification according to an embodiment of the invention. The eye tracking device 10 comprises a processing unit 12, a capturing device 14 that can comprise one or more cameras 14a, and optional light sources 16. This eye tracking device 10 can work as known eye tracking devices. The camera 14a is configured to capture images of a user, these images are passed to the processing unit 12 and processed, wherein certain eye features can be identified in the images and on the basis of these features the gaze direction and/or point of regard of the user can be determined. The optional light sources 16 can provide illumination, for example to produce corneal reflections on the eyes of the user, which can be detected in the images and used to calculate the gaze direction. The eye tracking device 10 can also comprise a display device 18 and the processing unit 12 can be configured to calculate a point of regard of the user on the screen of the display device 18. Therefore control functionalities can be provided on the basis of the calculated gaze direction and/or point of regard. So a user can, for example, control applications running on the eye tracking device 10 or on a system, like a computer, coupled to the eye tracking device 10 by means of his gaze similar as to using a mouse or other input devices. Moreover, the processing unit 12 comprises a user recognition module 12a and a GUI (Graphical User Interface) module 12b. Also, the eye tracking device 10 can comprise a storage device 20. However, this storage device 20 needs not to be part of the eye tracking device 10, but can also be part of another system, server, computer or the like, with which the eye tracking device 10 can be connected. The storage device 20 can for example also be an internet server, like the cloud, in which data can be stored.

The processing unit 12 now is configured to store user profiles P1, P2, P3 in this storage device 20. Here exemplarily three user profiles P1, P2, P3 for three different users are shown. Each user profile P1, P2, P3 contains identification data I1, I2, I3 and control data C1, C2, C3. Such identification data I1, I2, I3 can be for example face characteristics, body characteristics, eye characteristics, and so on, on the basis of which the different users can be identified. The control data C1, C2, C3, like calibration parameters, permissions, rights or priorities, can be used by the processing unit 12 for controlling purposes, for example to calculate the gaze direction and taking into consideration the respective calibration data of the respective user. The recognition module 12a matches the current user to one of the registered profiles P1, P2, P3, if a matching condition is fulfilled. The GUI module 12b can provide feedback to the user and allows the user for example to correct wrong identification results. For each user, all relevant data are stored within the corresponding profile P1, P2, P3. All the registered profiles P1, P2, P3 form a large database as the candidate pool of user identification. The identification data I1, I2, I3 preferably constitute data, which can be derived from captured images, however, such identification data can also be acquired otherwise, for example as voice characteristics captured by a microphone 14b, which can also be part of the capturing device 14 of the eye tracking device 10.

FIG. 2 shows a schematic illustration of a method for automatically identifying users according to an embodiment of the invention. In this case it is assumed, that a user is present, for example in a capturing area of the eye tracking device 10, which can be noticed by the eye tracking device 10 itself or e.g. by receiving a corresponding user input or the like. So the method starts in step S10, in which the eye tracking device 10 captures an image of the user by means of the camera 14a. This image is then passed to the processing unit 12, which in step S12 processes the image and derives user identification data from this image. After that, the processing unit 12 checks in step S14 whether a predefined matching condition is fulfilled. For doing so, the processing unit 12 compares the captured user identification data with the identification data I1, I2, I3 of each of the stored profiles P1, P2, P3. If the processing unit 12 determines, that the captured user identification data match one of the identification data I1, I2, I3 according to a predefined criterion the processing unit 12 derives in step S16 the corresponding calibration data, like calibration parameters, and so on, which are stored as part of the control data C1, C2, C3 of the profile P1, P2, P3 for which the matching condition was fulfilled. The processing unit 12 can then use these user specific calibration data for eye tracking. If, however, in step S14 the matching condition is not fulfilled for any of the stored profiles P1, P2, P3, the user is recognized as a new user and the eye tracking device 10 may automatically start a calibration procedure in step S18. This calibration can be an explicit or implicit calibration. During this calibration procedure the camera 14a captures images of the user in step S20, passes these images again to the processing unit 12 and again the processing unit 12 processes these images in step S22. When processing these images the processing unit 12 derives user identification data and calibration data, which are stored in step S24 in a corresponding user profile P1, P2, P3. These calibration data can then be used again for eye tracking purposes in step S16.

As an alternative, when the processing unit 12 determines, that the matching condition has not been fulfilled in step S14, the user identification data determined in step S12 can be directly saved into a corresponding user profile P1, P2, P3 in Step S24. In parallel the calibration can be performed, in which then only calibration data need to be determined, but not necessarily additional user identification data.

Moreover, this method can optionally begin with a step S0, in which the processing unit 12 checks whether at least one profile P1, P2, P3 is stored in the storage device 20. If no profile is stored at all, it is not necessary to check whether a user has a corresponding profile P1, P2, P3 or not and the eye tracking device 10 can initialize a calibration procedure in step S18 right away.

According to this method advantageously a new user can initialize a profile for the first time he or she uses the eye tracking device 10. Calibration data and image data for identification can be stored within this profile P1, P2, P3. Furthermore, it is possible to use this profile P1, P2, P3 on another eye tracking system, if it can be distributed. Also, when a user comes, the eye tracking device 10 tries to identify the user. If he or she is recognized as a registered user, the associated profile P1, P2, P3 will be loaded and the user can start eye tracking without any manual interaction. This quick response will greatly improve the user experience, especially in the scenario that different users change frequently in using the eye tracking device 10, but preferably restricted to a small group of people. Also, if the eye tracking device 10 recognizes a user as a new user, the eye tracking device 10 may ask the user to initialize a new profile and do a calibration, for example by supplying feedback to the user by means of the display device 18.

FIG. 3 shows schematically another embodiment of a method for automatic user identification by means of an eye tracking device.

The method shown in FIG. 3 again starts with capturing images in step S30. These images can then be used by the processing unit 12 on the one hand for performing eye tracking in step S32 as well as for face recognition and eye feature comparison in step S34. Especially, for face recognition and eye feature comparison results of the eye tracking process in step S32 can be used.

The imaging devices in eye tracking systems usually have the ability to capture the image of the whole face or large parts of the face, when necessary. Therefore, many face recognition techniques can be adapted to be used in this place, too. In addition to face recognition, this solution can be extended to use or include other information about the user for better recognition accuracy. The information may include the body images of the users captured by the imaging devices, the eye properties of the user from the eye tracking itself, eye motion pattern analyzed from the eye tracking results, the voices of the users, and so on. Since the accuracy of the user recognition drops when the number of candidates grows, the system or an administrator may have to maintain the size of the candidate pool.

These results and/or other user characteristics derived from the images can be compared to identification data derived from the registered profiles P1, P2, P3. From these registers profiles P1, P2, P3 that profile is selected in step S36, which matches best the captured user identification data. Optionally this selected profile can be confirmed by user feedback FB. Afterwards, this selected profile also contains calibration parameters for the recognized user, which in step S38 are applied to the eye data, which were outputted in step S40 as a result of the eye tracking process. Therefrom gaze data, the final gaze, especially gaze direction or the point of regard of the user can be determined in step S42.

In a more specific embodiment of this described method in step S30 the full face image of the user can be captured, which may involve face detection and camera control mechanism. For face recognition in step S34 a histogram of oriented gradient features can be computed from the face area after image normalization and the obtained features can be further processed with a dimension reduction technique to obtain compact and discriminative features. The core eye tracking method, executed in step S32, also processes the captured images and measures several eye properties, e.g. iris size and iris contrast. The results are then provided for the recognition process executed in step S34, in which the provided eye features are combined with the face image features obtained, as explained before. All users in the candidate pool have their corresponding feature vectors stored and their corresponding profiles P1, P2, P3. A feature matching technique, e.g. nearest neighbor matching, can select the best candidate in step S36. A similarity measure between the features from the current user and the ones from the best candidate has to be checked against a threshold to give the final recognition result. If the similarity is high enough, the current user has the same identity as the best candidate. If the similarity is low, the current user is considered as a new user. This can initiate an automatic storing of a new profile and/or a calibration procedure.

FIG. 4 shows a schematic illustration of a display screen of a display device 18 of the eye tracking device 10 for providing user feedback. The user can be provided with the option to overwrite a wrong identification result of the software. For this purpose, a pop-up window 24 can be shown, e.g. in a screen corner, on the display device 18, which presents the identification result, e.g. by a registered photo 22, and a pair of "buttons" as choosing options to receive a feedback from the user. Here a "correct" button C and a "wrong" button W are presented. By choosing the "correct" button C the user can confirm that the correct profile P1, P2, P3 was chosen, and by choosing the "wrong" button W the user can indicate that the wrong profile was chosen and the identification failed. If the user claims that the identification is wrong, then an option can be provided to enter or select the correct identity, especially to choose the correct profile P1, P2, P3. When there is no mouse/keyboard available as input device, the user can use the gaze interaction to give feedback, in particular by looking at the corresponding "button". However, without a correct calibration the eye tracking is much less accurate and therefore would require a larger area of the display 18 to implement such an interaction mechanism.

To improve the accuracy of user identification, the face image and eye features of the current user can be collected and merged into the existing data in the profile P1, P2, P3. So, each time a user uses the eye tracking device 10 again the eye tracking device 10 can store the captured identification data each time for the corresponding profile P1, P2, P3. To reduce the risk of error, this should only be done when the user feedback is available.

This way, when a user starts to use the system, i.e. the eye tracking device 10, with a computer display 18, the pop-up window 24 will notify the user about his/her recognized identity. The system then loads the stored calibration data while the user can immediately start using eye tracking. The users are not forced to give feedback, although it is recommended to do so when a wrong identity is assigned. If the user considers the identification result as wrong, the system can be notified and the user may enter his correct identity. The system, i.e. the eye tracking device 10, can also make use of this user interaction to improve its recognition accuracy. For example, the matching parameters, like the mentioned threshold, can be modified, if the user indicates, that the identification was wrong. Automatic user identification makes the association of the current user to an existing data collection (profile) much easier and more user-friendly. Combining this with a technique to predict user point of regard, e.g. by analyzing the image content on the display 18, one can completely hide the calibration.

The state of the art computer vision algorithm can predict the user gaze by analyzing what is shown on the display 18. A simpler case would be showing a single moving object on a simple background. For more natural images or videos, more sophisticated algorithms are required. Application tailored solution and simple images or videos could lead to more reliable results. Naturally the software cannot be sure whether the user is looking at a predicted position, e.g. a moving object, so certain "matching" analysis has to be done to get the reliable calibration data. Such a method may take longer time to achieve certain accuracy. However, since the data are collected with more variant conditions, the overall performance could be even better.

An embodiment of a method for automatically identifying users in combination with such an implicit calibration is shown for a game involving moving targets in FIG. 5. Here in step S50 the eye tracking device, especially the camera 14a, captures images of the user and provides these user images for user identification in step S52 and for eye tracking in step S54. In parallel, the application running on the eye tracking device 10, in this case a video game, shows image or video content on the display device 18 in step S56. This content is provided for the prediction of the point of regard of the user in step S58. If optionally input devices like a mouse or controller are used by a user in step S60 these data like the position of a cursor shown on the display device 18, can be provided for the user point of regard prediction in step S58 as well. So while the user is playing the video game, thereby watching the image content provided by the application, and is optionally using input devices, in the eye tracking process in step S54 the point of regard of the user is determined and compared in step S62 with corresponding predicted points of regard provided in step S58. For this comparison a data mining process can be performed for reliable calibration data. The user identification data provided in step S52 as well as the result of the data mining in step S62 can be stored in a corresponding user profile P1, P2, P3. This implicit calibration procedure can be performed until enough calibration data are captured. If then finally in step S64 it is determined that enough calibration data are captured, eye tracking device 10 is ready for eye tracking and then can perform eye tracking of the user in step S66.

The classical user calibration procedure used by the mainstream eye tracking systems is rather interruptive and unfriendly for certain application context. This presented implicit calibration therefore is a very advantageous alternative. When an application is using this feature, the gaze data and the predicted point of regard are fed into a pattern analysis module. The module collect calibration data, which can then be used for the current session and also for the future usage. The user may start the application without the gaze/eye tracking feature or less accurate gaze/eye tracking. After using the system for a while, the accurate gaze/eye tracking will be available.

The invention and its embodiments facilitate to improve the user experience of the eye tracking device by adding user identification function into the eye tracking device. It allows for a quick response to the recognized users and is essential to the usability of the eye tracking device in certain multiuser scenarios. It also opens the door to an eye tracking device using completely implicit calibration. So by this invention great improvements with regard to user experience regarding user data storage, especially the calibration data, can be achieved, multiuser eye tracking can be supported and the apparentness of the calibration process can be reduced.

Special advantages can be also achieved with regard to simultaneous multiuser eye tracking. When the eye tracking device has to track multiple users at the same time, the eye tracking device needs to know which calibration data should be applied to which person, especially which eyes of which person. This may involve user identification and user tracking, so that especially in this case the automatic user identification provided by the invention is very advantageous.

Another family multiuser scenario would be, for example, a boy playing an eye tracking based game and found something interesting, so he calls his father to try it, too. When the father comes, he can try the thing out immediately as long as he has used the system before. Without automatic user identification, he would have to first pause the game and notify the system to use his calibration data. Combining the automatic user identification and the image based gaze prediction the user can be calibrated without any direct interaction. This also allows the eye tracking technique to be integrated into an existing device/application much more implicitly. The user may enjoy the cool functions brought by the eye tracking before even noticing its existence.

With user identification, the system, namely the eye tracking device, has its own prediction for profile selection so that a registered user can start eye tracking immediately after he or she entered the tracking range (camera view). This will greatly improve the user experience, especially for family users, old people and people with disability.

LIST OF REFERENCE SIGNS 10 eye tracking device
12 processing unit
12a user recognition module
12b GUI module
14 capturing device
14a camera
14b microphone
16 light source
18 display device
20 storage device
22 photo
24 pop-up-window
P1, P2, P3 profile
I1, I2, I3 identification data
C1, C2, C3 control data
C correct button
W wrong button
FB feedback

The invention claimed is:

1. A method comprising:
capturing a plurality of images of an eye of a user;
determining, based on at least one of the plurality of images, one or more properties of the eye of the user;
in accordance with a determination that a predefined matching condition is not satisfied, generating, based on the one or more properties, a user profile including eye tracking calibration data that includes gaze correction information, wherein generating the user profile includes performing a calibration procedure in order to obtain the eye tracking calibration data; and
in accordance with a determination that the predefined matching condition is satisfied, determining, based on the gaze correction information, a gaze direction of the user.

2. The method of claim 1, wherein the one or more properties includes a geometric property of the eye of the user.

3. The method of claim 1, wherein the one or more properties includes a size of an iris of the eye of the user or a contrast of the iris of the eye of the user.

4. The method of claim 1, wherein the gaze correction information is indicative of an offset between a visual axis of the eye and an optical axis of the eye.

5. The method of claim 1, wherein the gaze correction information is indicative of a refractive power of a corrective lens.

6. The method of claim 1, wherein generating the user profile includes selecting, based on comparing the one or more properties to respective properties of one or more user profiles, the user profile from the one or more user profiles.

7. The method of claim 6, wherein comparing the one or more properties to the respective properties of the one or more user profiles includes generating respective similarity scores indicative of a similarity between the one or more properties and the respective properties of respective ones of the one of more user profiles.

8. The method of claim 7, wherein generating the user profile includes:
determining that the respective similarity score of the user profile exceeds a threshold; and
retrieving the user profile from a storage medium.

9. The method of claim 7, wherein generating the user profile includes:
determining that no respective similarity score exceeds a threshold; and
generating the user profile based on the one or more properties.

10. An apparatus comprising:
a camera to capture a plurality of images of an eye of a user;
a processor to:
determine, based on at least one of the plurality of images, one or more properties of the eye of the user;
in accordance with a determination that a predefined matching condition is not satisfied, generate, based on the one or more properties, a user profile including eye tracking calibration data that includes gaze correction information, wherein generation of the user profile includes performing a calibration procedure in order to obtain the eye tracking calibration data; and
in accordance with a determination that the predefined matching condition is satisfied, determine, based on the gaze correction information, a gaze direction of the user.

11. The apparatus of claim 10, wherein the one or more properties include a geometric property of the eye of the user.

12. The apparatus of claim 10, wherein the gaze correction information is indicative of an offset between a visual axis of the eye and an optical axis of the eye.

13. The apparatus of claim 10, wherein the gaze correction information is indicative of a refractive power of a corrective lens.

14. The apparatus of claim 10, wherein the processor is configured to generate the user profile by:
generating respective similarity scores indicative of a similarity between the one or more properties and respective properties of respective ones of one or more user profiles;
determining that the respective similarity score of the user profile exceeds a threshold; and
retrieving the user profile from a storage medium.

15. The apparatus of claim 10, wherein the processor is configured to generate the user profile by:
generating respective similarity scores indicative of a similarity between the one or more properties and respective properties of respective ones of one or more user profiles;
determining that no similarity score exceeds a threshold; and
generating the user profile based on the one or more properties.

16. A non-transitory computer-readable medium encoding instructions which, when executed, cause a processor to perform operations comprising:
determining, based on at least one of a plurality of captured images, one or more properties of the eye of the user;
in accordance with a determination that a predefined matching condition is not satisfied, generating, based on the one or more properties, a user profile including eye tracking calibration data that includes gaze correction information, wherein generating the user profile includes performing a calibration procedure in order to obtain the eye tracking calibration data; and in accordance with a determination that the predefined matching condition is satisfied, determining, based on the gaze correction information, a gaze direction of the user.

17. The non-transitory computer-readable medium of claim 16, wherein the gaze correction information is indicative of an offset between a visual axis of the eye and an optical axis of the eye.

18. The non-transitory computer-readable medium of claim 16, wherein the gaze correction information is indicative of a refractive power of a corrective lens.

19. The method of claim 1, wherein the user profile includes control data, and wherein the gaze direction is determined at least in part based on the control data.

20. The apparatus of claim 10, wherein the user profile includes control data, and wherein the gaze direction is determined at least in part based on the control data.

* * * * *